United States Patent
Miyasaka et al.

(10) Patent No.: US 8,211,336 B2
(45) Date of Patent: Jul. 3, 2012

(54) METHOD FOR PRODUCING NONAQUEOUS ELECTROLYTE SECONDARY BATTERY

(75) Inventors: Hanako Miyasaka, Shimada (JP); Takaaki Iguchi, Kyoto (JP); Junichi Kuratomi, Kyoto (JP); Sumio Mori, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 536 days.

(21) Appl. No.: 12/310,945

(22) PCT Filed: Sep. 7, 2007

(86) PCT No.: PCT/JP2007/067515
§ 371 (c)(1),
(2), (4) Date: May 12, 2009

(87) PCT Pub. No.: WO2008/032657
PCT Pub. Date: Mar. 20, 2008

(65) Prior Publication Data
US 2010/0018034 A1   Jan. 28, 2010

(30) Foreign Application Priority Data

Sep. 12, 2006   (JP) .................. 2006-247072

(51) Int. Cl.
*H01B 1/20* (2006.01)
*H01M 6/16* (2006.01)

(52) U.S. Cl. ............ 252/519.15; 252/519.3; 252/519.4; 252/521.2; 29/623.1; 429/329; 429/340; 429/223; 429/224

(58) Field of Classification Search ............ 252/519.15, 252/519.3, 519.4, 521.2; 29/623.1; 429/329, 429/340, 223, 224
See application file for complete search history.

(56) References Cited

U.S. PATENT DOCUMENTS

| | | | |
|---|---|---|---|
| 2003/0170549 A1* | 9/2003 | Murai | 429/329 |
| 2005/0130035 A1* | 6/2005 | Inada et al. | 429/161 |
| 2005/0221180 A1* | 10/2005 | Shimura et al. | 429/223 |
| 2006/0228626 A1* | 10/2006 | Kawashima et al. | 429/200 |
| 2007/0015048 A1* | 1/2007 | Lee et al. | 429/118 |

FOREIGN PATENT DOCUMENTS

| | | |
|---|---|---|
| JP | 10-189042 A | 7/1998 |
| JP | 2002-329528 A | 11/2002 |
| JP | 2003-308875 A | 10/2003 |
| JP | 2004-265849 A | 9/2004 |
| JP | 2006-140115 A | 6/2006 |
| WO | WO 03/081698 A1 | 10/2003 |

OTHER PUBLICATIONS

English Translation of JP 2006-140115, Jun. 1, 2006.*
Jang et al., "Stabilization of LiMnO2 in the alpha-NaFeO2 Structure Type by LiAlO2 Addition", Electrochemical and Solid-State Letters, 1(1) 13-16 (1998).*

* cited by examiner

Primary Examiner — Douglas M C Ginty
(74) Attorney, Agent, or Firm — Carrier Blackman & Associates, P.C.; Joseph P. Carrier; William D. Blackman

(57) ABSTRACT

Disclosed is a nonaqueous electrolyte secondary battery which is suppressed in increase of internal resistance, while having high capacity retention rate and small battery swelling even after a long use. Specifically disclosed is a method for manufacturing a nonaqueous electrolyte secondary battery, which is characterized by using a positive electrode containing a positive electrode active material having an α-NaFeO2 crystal structure and the following chemical composition: $Li_xMn_aNi_bCo_cO_d$ (wherein $0<x<1.3$, $a+b+c=1$, $1.7 \leq d \leq 2.3$), while satisfying $|a-b|<0.03$ and $0.33 \leq c<1$, a negative electrode, and a nonaqueous electrolyte containing an unsaturated sultone and a sulfate ester compound.

6 Claims, 1 Drawing Sheet

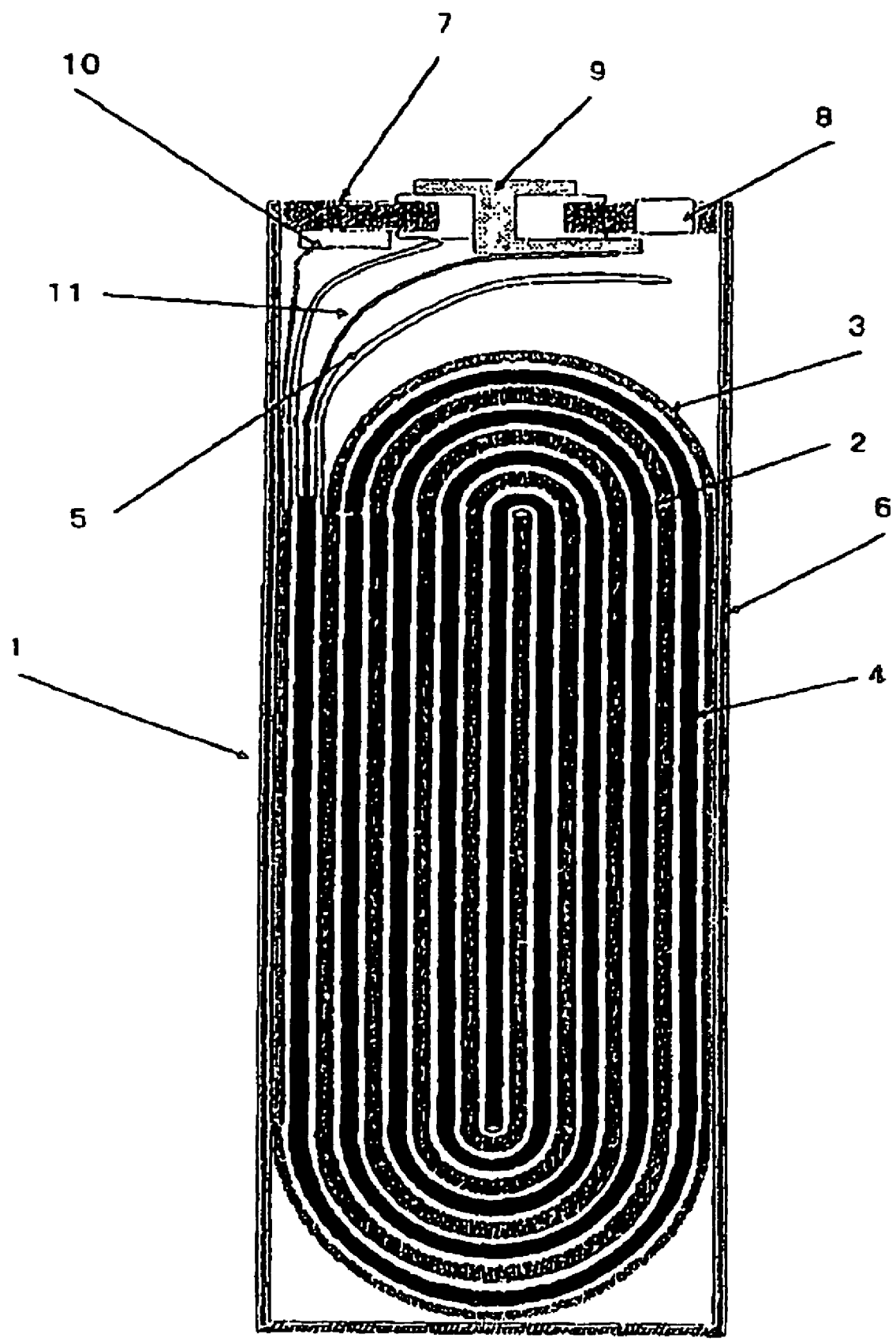

METHOD FOR PRODUCING NONAQUEOUS ELECTROLYTE SECONDARY BATTERY

TECHNICAL FIELD

The present invention relates to a method for producing a nonaqueous electrolyte secondary battery.

BACKGROUND ART

Along with rapid reduction in size and weight and diversification of cellular phones, portable appliances, and mobile information terminals for civil uses, with respect to batteries for their power sources, it has been required to develop secondary batteries which are small in size and light in weight, have high energy density, and can repeatedly be charged and discharged for a long duration. Especially, as compared with lead batteries and nickel-cadmium batteries using aqueous electrolyte solutions, nonaqueous electrolyte secondary batteries such as lithium ion secondary batteries as secondary batteries satisfying these requirements are most highly expected and various investigations have actively been made.

A nonaqueous electrolyte secondary battery includes a positive electrode, a negative electrode, and a nonaqueous electrolyte and as a positive active material have been investigated various compounds such as titanium disulfide, vanadium pentoxide, molybdenum trioxide, as well as compounds defined by a general formula $Li_xMO_2$ (wherein, M is one or more transition metals) such as lithium cobalt composite oxides, lithium nickel composite oxides, and spinel type lithium manganese oxides. Especially, lithium cobalt composite oxides, lithium nickel composite oxides, and spinel type manganese composite oxides can actualize batteries having high discharge voltage by being used as a positive electrode since they are capable of charge-discharge at extremely high (noble) potential of 4V (vs $Li/Li^+$) or higher.

As a negative active material of a nonaqueous electrolyte secondary battery, various kinds of metal lithium, lithium alloys, carbon materials cable of absorbing and releasing lithium, and the like have been investigated, and especially, if a carbon material is used, it is advantageous since batteries excellent in charge-discharge cycle performance can be obtained and safety is very high.

As an electrolyte of a nonaqueous electrolyte secondary battery have been employed electrolyte solutions obtained generally by dissolving supporting salts such as LiPF6 and LiBF4 in mixed solvents of high dielectric solvents such as ethylene carbonate and propylene carbonate with low viscosity solvents such as dimethyl carbonate and diethyl carbonate.

In recent years, demand for nonaqueous electrolyte secondary batteries as a power source for transport bodies such as hybrid cars has been increased and also capability of charge and discharge at high electric current to correspond to rapid charge-discharge, that is, retention of high input and output performance for a long duration has been required besides the high energy density conventionally regarded to be important.

With respect to a method for suppressing an increase of the inner resistance of a nonaqueous electrolyte secondary battery during long time use, no method has been made available yet and it is required to further enhance the charge-discharge cycle performance by improving an active material, a current collection structure, a separator, and a nonaqueous solution and improving a method of adding and mixing additives in an electrolyte solution.

Patent Document 1 discloses that a battery containing an electrolyte solution to which a cyclic sulfuric acid ester is added shows small capacity deterioration caused along with the course of charge-discharge cycle. Patent Document 2 discloses that a battery provided with a nonaqueous electrolyte solution containing 1,3-propene sultone shows low self discharge and is suppressed from deterioration of load performance and resistance and that the amount of a gas generated in the battery is decreased.

Patent Document 3 contains a description in claim 1, "a nonaqueous electrolyte secondary battery having a nonaqueous electrolyte containing at least one compound selected from sultone compounds, cyclic sulfate esters, and vinylene carbonates and at least one derivative selected from alkylbenzene derivatives having tertiary carbon neighboring to a phenyl group, cycloalkylbenzene derivatives, and biphenyl derivatives. However, there is no specific description of batteries using both of a sultone compound and a cyclic sulfate ester.

None of Patent Documents 1 to 3 describe a battery of which an increase of inner resistance is suppressed, as well as capacity retention ratio is high and expansion is small even in a case of long time use by employing an unsaturated sultone and a cyclic sulfate ester in combination and specifying a positive active material composition.

Patent Document 1: Japanese Patent Application Laid-Open No. 10-189042

Patent Document 2: Japanese Patent Application Laid-Open No. 2002-329528

Patent Document 3: Japanese Patent Application Laid-Open No. 2003-308875

DISCLOSURE OF THE INVENTION

Problem to be Solved by the Invention

It is an object of the present invention to provide a nonaqueous electrolyte secondary battery of which an increase of inner resistance is suppressed, as well as capacity retention ratio is high and expansion is small even during long time use.

Means for Solving the Problems

The present invention according to a first aspect thereof is a method for producing a nonaqueous electrolyte secondary battery including a positive electrode containing a positive active material having an $\alpha$-$NaFO_2$-type crystal structure and being expressed by a composition formula $Li_xMn_aNi_bCo_cO_d$ ($0<x<1.3$; $a+b+c=1$; $1.7 \leq d \leq 2.3$) while satisfying $|a-b|<0.03$ and $0.33 \leq c<1$, a negative electrode, and a nonaqueous electrolyte containing an unsaturated sultone and a sulfate ester compound.

In addition, the positive active material to be used in the battery of the present invention is a lithium transition metal composite oxide; however a technique of using, as a positive active material, a lithium transition metal composite oxide of which the transition metal is partially replaced with a different element, or which is doped with a different element, or to the surface of which another kind element is applied has been known well and such a technique may be employed for the positive active material to be used for the battery of the present invention and may be within the scope of the present invention. That is, in a case the transition metal is partially replaced with another kind of element M, the composition formula within the scope of the present claims may be understood as "$Li_xMn_aNi_bCo_cM_yO_d$ ($0<x<1.3$; $a+b+c+y=1$; $1.7 \leq d \leq 2.3$); $|a-b|<0.03$; and $\frac{1}{3} \leq c<1$". Examples of the different element are not particularly limited; however they are preferably one or more of Al, Mg, Ca, Sr, Y, Yb, Gd, and Ce.

In the method for producing a nonaqueous electrolyte secondary battery according to a second aspect of the present invention, in addition to the first aspect, a 1,3-propene sultone derivative in which the above unsaturated sultone is defined by the chemical formula 1.

[Chemical Formula 1]

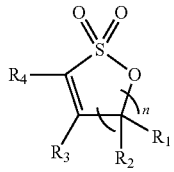

(herein, $R_1$ to $R_4$ each denote a hydrogen atom or the same or different alkyl group, an alkoxy group, halogen, a halogen-containing alkyl group, or an aryl group; and n is 1 or 2).

In the method for producing a nonaqueous electrolyte secondary battery according to a third aspect of the present invention, in addition to the first or second aspect, a cyclic sulfate ester having 3 or more carbon atoms in which the sulfate ester compound is defined by the chemical formula 2.

[Chemical Formula 2]

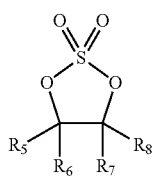

(herein, $R_5$ to $R_8$ each denote a hydrogen atom or the same or different alkyl group, an alkoxyl group, halogen, a halogen-containing alkyl group, or an aryl group).

Effects of the Invention

According to the present invention, a nonaqueous electrolyte secondary battery of which an increase of inner resistance is suppressed, as well as capacity retention ratio is high, and expansion is small even during long time use can be provided.

BRIEF DESCRIPTION OF THE DRAWINGS

FIG. 1 is a drawing showing a cross sectional structure of prismatic batteries of Examples and Comparative Examples of the present invention.

DESCRIPTION OF REFERENCE NUMERALS

1. Prismatic nonaqueous electrolyte secondary battery
2. Winding type electrode unit
3. Positive electrode
4. Negative electrode
5. Separator
6. Battery case
7. Battery cover
8. Safety valve
9. Negative electrode terminal
10. Positive electrode lead
11. Negative electrode lead Best Mode For Carrying Out The Invention With respect to a nonaqueous electrolyte secondary battery including a positive electrode, a negative electrode, and a nonaqueous electrolyte of the present invention, the above nonaqueous electrolyte contains an unsaturated sultone and a sulfate ester compound, and a positive active material contained in the positive electrode is a composite oxide $Li_xMn_aNi_bCo_cO_d$ ($0<x<1.3$; $a+b+c=1$; $1.7 \leq d \leq 2.3$) having a layer type α-NaFO2-type crystal structure and satisfying $|a-b|<0.03$ and $0.33 \leq c<1$.

With respect to the nonaqueous electrolyte secondary battery including a positive electrode, a negative electrode, and a nonaqueous electrolyte, the effect of an unsaturated sultone and a sulfate ester compound to suppress an increase of resistance along with the repeated charge-discharge cycles, keep a high capacity, and suppress expansion of the battery can specifically be observed by adding the unsaturated sultone and the sulfate ester compound as additives to the nonaqueous electrolyte and a positive active material contained in the above positive electrode is to be a composite oxide $Li_xMn_aNi_bCo_cO_d$ ($0<x<1.3$; $a+b+c=1$; $1.7 \leq d \leq 2.3$) having a layer type α-NaFO2-type crystal structure satisfying $|a-b|<0.03$ and $0.33 \leq c<1$ and preferably $0.50 \leq c \leq 0.83$.

In the present invention, at least each one of unsaturated sultones and sulfate esters are contained as nonaqueous electrolytes and either an electrolyte solution or a solid electrolyte can be used. Further, substances other than the unsaturated sultone and the sulfate ester may also be usable. In a case of using the electrolyte solution, examples to be used as a solvent of the electrolyte solution include a nonaqueous solvent alone or a mixture of the nonaqueous solvents such as ethylene carbonate, propylene carbonate, butylene carbonate, trifluoropropylene carbonate, γ-butyrolactone, γ-valerolactone, sulfolane, 1,2-dimethoxyethane, 1,2-diethoxyethane, tetrahydrofuran, 2-methyltetrahydrofuran, 3-methyl-1,3-dioxolane or halogenated dioxolane, trifluoroethyl methyl ether, ethylene glycol diacetate, propylene glycol diacetate, ethylene glycol dipropionate, propylene glycol dipropionate, methyl acetate, ethyl acetate, propyl acetate, butyl acetate, methyl propionate, ethyl propionate, propyl propionate, methyl fluoroacetate, ethyl fluoroacetate, propyl fluoroacetate, dimethyl carbonate, diethyl carbonate, ethyl methyl carbonate, methyl propyl carbonate, ethyl propyl carbonate, dipropyl carbonate, methyl isopropyl carbonate, ethyl isopropyl carbonate, diisopropyl carbonate, dibutyl carbonate, acetonitrile, fluoroacetonitrile; alkoxy- and halogen-substituted cyclic phosphazenes such as ethoxypentafluorocyclophosphazene, diethoxytetrafluorocyclophosphazene, and phenoxypentafluorocyclotriphosphazene; linear phosphazenes, phosphoric acid alkyl esters such as triethyl phosphate, trimethyl phosphate, and octyl phosphate; boric acid esters such as triethyl borate and tributyl borate; and N-methyloxazolidinone and N-ethyloxazolidinone.

In the nonaqueous electrolyte secondary battery of the present invention, the unsaturated sultone to be added to the nonaqueous electrolyte is preferably a 1,3-propenesultone derivative defined by the following chemical formula 1.

[Chemical Formula 1]

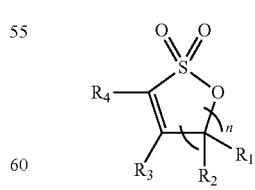

(herein, $R_1$ to $R_4$ each denote a hydrogen atom or the same or different alkyl group, an alkoxyl group, halogen, a halogen-containing alkyl group, or an aryl group; and n is 1 or 2).

The unsaturated sultone defined by the chemical formula 1 is desirable to be added in a range of 0.01 to 5.0% by mass in the nonaqueous electrolyte at the time of producing the battery and may properly be increased or decreased in this range in accordance with the design of the battery. The effect to suppress an increase of resistance along with the charge-discharge cycle can be made sufficiently by adjusting the content of the unsaturated sultone contained in the nonaqueous electrolyte to be used at the time of producing the battery to be 0.01% by mass or higher. Further, if the content of the unsaturated sultone is adjusted to be 5.0% by mass or lower, the probability that the inner resistance of the battery becomes too high can be suppressed. Particularly, it is preferable to be in a range of 0.2 to 2.0% by mass.

With respect to the nonaqueous electrolyte secondary battery of the present invention, the sulfate ester to be added to the nonaqueous electrolyte is preferably a cyclic sulfate ester having 3 or more carbon atoms and defined by the following chemical formula 2 and examples thereof include, but are not limited to, 1,2-butanediol sulfate ester, 1,2-propanediol sulfate ester and the like.

[Chemical Formula 2]

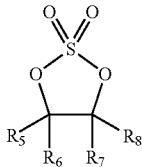

(herein, $R_5$ to $R_8$ each denote a hydrogen atom or the same or different alkyl group, an alkoxyl group, halogen, a halogen-containing alkyl group, or an aryl group).

The sulfate ester defined by the chemical formula 2 is preferable to be contained in a range of 0.01 to 5.0% by mass and more preferable in a range of 0.2 to 2.0% by mass.

The nonaqueous electrolyte differs in accordance with a nonaqueous electrolyte and a supporting salt to be used and in general, 0.5 to 1.5 mol/L of the supporting salt is dissolved in these nonaqueous solvents for use. Examples of the supporting salt to be used are salts such as $LiClO_4$, $LiPF_6$, $LiBF_4$, $LiAsF_6$, $LiCF_3CO_2$, $LiCF_3SO_3$, $LiCF_3CF_2SO_3$, $LiCF_3CF_2CF_2SO_3$, $LiN(SO_2CF_3)_2$, $LiN(SO_2CF_2CF_3)_2$, $LiN(COCF_3)_2$, $LiN(COCF_2CF_3)_2$, $LiBF_2C_2O_4$, $LiBC_4O_8$, $LiPF_2(C_2O_4)_2$, and $LiPF_3(CF_2CF_3)_3$ and their mixtures.

In order to improve the battery performance, besides the unsaturated sultone and the sulfate ester, the following additives may be added generally in the amount of 0.01 to 2% by mass based on the nonaqueous electrolyte weight although it differs depending on the types of the additives: that is, phosphate compounds, carbonates such as vinylene carbonate, methylvinylene carbonate, ethylvinylene carbonate, propylvinylene carbonate, phenylvinylene carbonate, vinylethylene carbonate, divinylethylene carbonate, dimethylvinylene carbonate, diethylvinylene carbonate and fluoroethylene carbonate; vinyl esters such as vinyl acetate and vinyl propionate; sulfides such as diallyl sulfide, allyl phenyl sulfide, allyl vinyl sulfide, allyl ethyl sulfide, propyl sulfide, diallyl disulfide, allyl ethyl disulfide, allyl propyl disulfide and allyl phenyl disulfide; sultones such as 1,3-propanesultone, 1,4-butanesultone and 1,3-prop-2-ene sultone; chain sulfonate esters such as methyl methanesulfonate, ethyl methanesulfonate, propyl methanesulfonate, methyl ethanesulfonate, ethyl ethanesulfonate, propyl ethanesulfonate, methyl benzenesulfonate, ethyl benzenesulfonate, propyl benzenesulfonate, phenyl methanesulfonate, phenyl ethanesulfonate, phenyl propanesulfonate, methyl benzylsulfonate, ethyl benzylsulfonate, propyl benzylsulfonate, benzyl methanesulfonate, benzyl ethanesulfonate and benzyl propanesulfonate; sulfite esters such as dimethyl sulfite, diethyl sulfite, ethyl methyl sulfite, methyl propyl sulfite, ethyl propyl sulfite, diphenyl sulfite, methyl phenyl sulfite, ethyl methyl sulfite, ethylene sulfite, vinylethylene sulfite, divinylethylene sulfite, propylene sulfite, vinylpropylene sulfite, butylene sulfite, vinylbutylene sulfite, vinylene sulfite and phenylethylene sulfite; aromatic compounds such as benzene, toluene, xylene, biphenyl, cyclohexylbenzene, 2-fluorobiphenyl, 4-fluorobiphenyl, diphenyl ether, tert-butylbenzene, ortho-terphenyl, meta-terphenyl, naphthalene, fluoronaphthalene, cumene, fluorobenzene and 2,4-difluoroanisol; halogen-substituted alkanes such as perfluorooctane; trimethylsilyl borate and triethylsilyl borate and these additives may be added properly in accordance with purposes.

In a case of using the solid electrolyte, as a solid polymer electrolyte, a porous solid polymer electrolyte is used and it is better to make the solid polymer electrolyte contain an electrolyte solution. Further, in a case a gel solid polymer electrolyte is used, an electrolyte solution composing the gel and an electrolyte solution contained in the fine pores may be different. In a case such a solid polymer electrolyte is used, an unsaturated sultone may be added to the electrolyte solution. However, in a case high output is required for HEV uses or the like, rather than the solid electrolyte and the solid polymer electrolyte, a nonaqueous electrolyte is more preferable to be used alone as the electrolyte.

With respect to a compound to be the positive electrode material, as an active material, a compound defined as $Li_xMn_aNi_bCo_cO_d$ ($0<x<1.3$; $a+b+c=1$; $|a-b|<0.03$; $0.33 \leq c<1$; and $1.7 \leq d \leq 2.3$) is contained.

Further, in addition to the above active material, other positive active materials may be used in a form of a mixture and examples of the other positive active materials include, but are not limited to, Group I metal compounds such as CuO, $Cu_2O$, $Ag_2O$, CuS, and $CuSO_4$; Group IV metal compounds such as $TiS_2$, $SiO_2$, and SnO; Group V element compounds such as $V_2O_5$, $V_6O_{12}$, $VO_x$, $Nb_2O_5$, $Bi_2O_8$, and $Sb_2O_3$; Group VI metal compounds such as $CrO_8$, $Cr_2O_8$, $MoO_8$, $MoS_2$, $WO_3$, and $SeO_2$; Group VII metal compounds such as $MnO_2$ and $Mn_2O_8$; Group VIII metal compounds such as $Fe_2O_3$, FeO, $Fe_3O_4$, $Ni_2O_3$, NiO, $CoO_3$, and CoO; metal oxides such as lithium-cobalt type composite oxides and lithium-manganese type composite oxide; further conductive polymer compounds such as disulfide, polypyrrole, polyaniline, poly-p-phenylene, polyacetylene and polyacene type materials; and carbonaceous materials having pseudo graphite structures.

The positive electrode is produced by mixing the above lithium-containing transition metal oxide with a dielectric agent and a binder and further, if necessary, a filler to obtain a positive composite; applying or pressure bonding the positive composite to a foil or a lath plate as a current collector; and heating the resulting body at a temperature about 50° C. to 250° C. for 2 hours. In addition to the above main constituent components, the positive electrode may contain an electronic conductive agent, a binder, a thickener, a filler and the like as other constituent components.

Use of the positive active material characteristic in the present invention can cause a specific effect of the unsaturated sultone and the sulfate ester compound additives, remarkably suppress an increase of resistance increase along with the repeated charge-discharge cycles; and considerably improve the charge-discharge cycle performance.

In the positive active material, the positive active material can be provided with a highly efficient discharge performance and high discharge capacity by adjusting as $|a-b|<0.03$ (reference to WO03/081698). Specifically, in a case Mn is in excess as a−b>0.03, the discharge capacity is decreased and in a case Ni is in excess as a−b<−0.03, although the discharge capacity is good, the safety becomes insufficient. That is, with a positive active material out of the range satisfying |a−b|<0.03, the total balance of the highly efficient discharge performance, the discharge capacity, and the safety is more inferior than that in a case of the positive active material within the scope of the claims.

Further, adjustment to satisfy $0.33 \leq c<1$ makes it possible to lower the initial resistance value of the nonaqueous electrolyte secondary battery before use. This effect is particularly noticeable at low temperature.

A compound to be used for a negative electrode material contains a carbon material capable of absorbing and releasing lithium, and usable for the compound are amorphous materials such as hardly graphitized carbon and easily graphitized carbon and crystalline carbon materials such as graphite. Particularly preferably, it is desirable to use amorphous materials. Further, it is also possible to reform the material by using metal oxides such as tin oxides and silicon oxides; phosphorus, boron, and fluorine in addition to the carbon materials. Particularly, decomposition of the electrolyte can be suppressed and the battery performance can be improved by reforming the surface of the carbon material in the above manner and it is desirable.

Further, it is also possible to use lithium metal and a lithium metal-containing ally such as lithium-aluminum, lithium-lead, lithium-tin, lithium-aluminum-tin, lithium-gallium and a Wood's alloy, or use of the metal and alloys in combination, or use a carbon material and the like into which lithium is inserted by previous electrochemical reduction, as the negative electrode material.

Furthermore, as a separator of the nonaqueous electrolyte secondary battery according to the present invention, a fabric, a nonwoven fabric, a synthetic resin finely porous membrane, and the like can be used and particularly, a synthetic resin finely porous membrane is used preferably. Especially, polyolefin type finely porous membranes such as finely porous membranes made of polyethylene and polypropylene; finely porous membranes made of polyethylene and polypropylene composite with aramides or polyimides; and finely porous membranes in which these materials are composite are preferably usable in terms of the thickness, membrane strength, membrane resistance and the like.

Further, it is also made possible to use a solid electrolyte such as a solid polymer electrolyte or the like as a separator. Moreover, the synthetic resin finely porous membrane and the solid polymer electrolyte may be used in combination. In this case, a porous solid polymer electrolyte membrane may be used as the solid polymer electrolyte and further, an electrolyte solution may be contained in the solid polymer electrolyte. However, in this case, since it becomes a cause of decreasing output of the battery, the amount of the solid polymer electrolyte is preferable to be suppressed to the minimum.

The shape of the battery is not particularly limited and it may be any shape such as prismatic, elliptic cylindrical, coin type, button type, sheet type, and cylindrical batteries applicable for various nonaqueous electrolyte secondary batteries.

EXAMPLES

Hereinafter, specific Examples applied with the present invention will be described; however it is not intended that the present invention be limited to the illustrated Examples, and the present invention can be carried out with a proper alteration within the scope of the present invention.

Example 1

FIG. 1 is a schematic cross sectional drawing of a prismatic nonaqueous electrolyte secondary battery in this Example. This prismatic nonaqueous electrolyte secondary battery 1 includes a winding type electrode unit 2 obtained by winding a positive electrode 3 obtained by applying a positive composite to an aluminum current collector and a negative electrode 4 obtained by applying a negative composite to a copper current collector with a separator 5 interposed therebetween and an nonaqueous electrolyte stored in a battery case 6 and has width 34 mm×height 50 mm×thickness 5.0 mm.

To the battery case 6, a battery cover 7 equipped with a safety valve 8 was attached by laser welding and a negative electrode terminal 9 was connected to the negative electrode 4 through a negative electrode lead 11 and the positive electrode 3 was connected to the battery cover 7 through a positive electrode lead 10.

A positive plate was produced by preparing a paste like material by adding N-methylpyrrolidone to a positive composite obtained by mixing 6% by mass of polyvinylidene fluoride as a binder, 6% by mass of acetylene black as an electronic conductive agent, and 88% by mass of a lithium-manganese-nickel-cobalt composite oxide $LiMn_{0.09}Ni_{0.08}Co_{0.83}O_2$ as a positive active material, applying the material to both surfaces of an aluminum foil current collector with a thickness of 20 μm, and drying the material.

A negative plate was produced by preparing a paste like material by adding 90% by mass of hardly graphitized carbon and 10% by mass of polyvinylidene fluoride to N-methylpyrrolidone, applying the material to both surfaces of a copper foil current collector with a thickness of 10 μm, and drying the material.

A polyethylene finely porous membrane was used as the separator and as the electrolyte solution, $LiPF_6$ in a proper amount to be 1 mol/L after adjustment was dissolved in a solvent mixture of ethyl carbonate (EC):dimethyl carbonate (DMC):ethyl methyl carbonate (EMC)=3:2:5 (ratio by volume). As the unsaturated sultone, 1,3-propene sultone (PRS) was added in an amount of 0.5% by weight in the entire amount of the electrolyte solution and as the sulfate ester, 1,2-pentanediol sulfate ester (PEGLST) was added in an amount of 0.5% by weight in the entire amount of the electrolyte solution.

Three cells of a nonaqueous electrolyte secondary battery of Example 1 were produced in the above configuration and procedure.

Examples 2 to 6 and Comparative Examples 1 to 10

With respect to Examples 2 to 6 and Comparative Examples 1 to 10, three cells of nonaqueous electrolyte secondary batteries were produced in the same manner as in Example 1, respectively, except that the compositions of the positive active materials were changed as shown in Table 1. However, with respect to Comparative Example 5, a lithium manganese oxide $LiMn_2O_4$ having a spinel type crystal structure was used as a positive active material and with respect to Comparative Example 1, Comparative Example 7, and Comparative Example 10, a lithium manganese oxide $LiCoO_2$ was used as a positive active material. Further, in Comparative Example 8, three cells of a nonaqueous electrolyte secondary battery were produced in the same manner as in Example 4, except that in the nonaqueous electrolyte to be used at the time of producing the battery, the addition amount of PRS was set to be 1.0% and no PEGLST was added. Further, in Comparative Example 9, three cells of a nonaqueous electrolyte secondary battery were produced in the same manner as in Example 4, except that no PRS was added and the addition amount of PEGLST was set to be 1.0%. In Comparative Examples 6 and 7, three cells of nonaqueous electrolyte secondary batteries were produced in the same manner as in Example 4 and Comparative Example 1, respectively, except that neither PRS nor PEGLST was added. In Example 6 and Comparative Example 10, three cells of nonaqueous electrolyte secondary batteries were produced in the same manner as in Example 4 and Comparative Example 1, respectively, except that 0.5% by weight of vinylene carbonate (VC) was added in the entire amount of the electrolyte solution besides PRS and PEGLST.

The measurement of the resistance value before and after the charge-discharge cycle test was carried out daringly in a severe condition of $-20°$ C. at which an increase of resistance became significant. The measurement of the initial resistance value was carried out setting the state of charge (SOC) of the battery by constant current-constant voltage charging at 1 ItmA of charging current and 3.78 V of charging voltage for 3 hours to be 50%, cooling to $-20°$ C.; measuring voltage at the time of discharge at 0.5 ItmA for 10 seconds, voltage at the time of discharge at 1 ItmA for 10 seconds, voltage at the time of discharge at 2 ItmA for 10 seconds, and voltage at the time of discharge at 5 ItmA for 10 seconds, respectively, after 4 hours; and measuring the slope ($R_a=E/I$) of the voltage decrease (E) to the discharge current (I): and this value ($R_a$) was defined as "initial resistance value ($\Omega$)". For respective

TABLE 1

| | Composition formula | Coefficient in $LiMn_aNi_bCo_cO_2$ | | Initial resistance value ($\Omega$) | Resistance increase ratio (%) | Capacity retention ratio (%) | Cell thickness (mm) | Additive | | |
|---|---|---|---|---|---|---|---|---|---|---|
| | | c | \|a − b\| | | | | | PRS | PEGLST | VC |
| Example 1 | $LiMn_{0.02}Ni_{0.03}Co_{0.95}O_2$ | 0.95 | 0.01 | 0.32 | 1.9 | 94.6 | 5.14 | 0.5% | 0.5% | — |
| Example 2 | $LiMn_{0.09}Ni_{0.08}Co_{0.83}O_2$ | 0.83 | 0.01 | 0.22 | 1.2 | 96.2 | 5.13 | 0.5% | 0.5% | — |
| Example 3 | $LiMn_{0.17}Ni_{0.16}Co_{0.67}O_2$ | 0.67 | 0.01 | 0.26 | 0.7 | 95.7 | 5.11 | 0.5% | 0.5% | — |
| Example 4 | $LiMn_{0.25}Ni_{0.25}Co_{0.56}O_2$ | 0.50 | 0.00 | 0.30 | 1.4 | 93.0 | 5.12 | 0.5% | 0.5% | — |
| Example 5 | $LiMn_{0.34}Ni_{0.33}Co_{0.33}O_2$ | 0.33 | 0.01 | 0.37 | 3.0 | 90.9 | 5.13 | 0.5% | 0.5% | — |
| Example 6 | $LiMn_{0.25}Ni_{0.25}Co_{0.50}O_2$ | 0.50 | 0.00 | 0.31 | 1.4 | 94.5 | 5.11 | 0.5% | 0.5% | 0.5% |
| Comparative Example 1 | $LiCoO_2$ | 1.00 | 0.00 | 1.15 | 9.2 | 81.4 | 5.43 | 0.5% | 0.5% | — |
| Comparative Example 2 | $LiMn_{0.40}Ni_{0.40}Co_{0.20}O_2$ | 0.20 | 0.00 | 0.58 | 5.4 | 82.3 | 5.37 | 0.5% | 0.5% | — |
| Comparative Example 3 | $LiMn_{0.20}Ni_{0.30}Co_{0.50}O_2$ | 0.50 | 0.10 | 0.67 | 5.1 | 90.0 | 5.31 | 0.5% | 0.5% | — |
| Comparative Example 4 | $LiMn_{0.40}Ni_{0.30}Co_{0.30}O_2$ | 0.30 | 0.10 | 1.11 | 6.9 | 79.9 | 5.44 | 0.5% | 0.5% | — |
| Comparative Example 5 | $LiMn_2O_4$ | — | — | 1.97 | 13.3 | 77.8 | 5.72 | 0.5% | 0.5% | — |
| Comparative Example 6 | $LiMn_{0.25}Ni_{0.25}Co_{0.50}O_2$ | 0.50 | 0.01 | 0.45 | 12.2 | 88.1 | 5.40 | — | — | — |
| Comparative Example 7 | $LiCoO_2$ | 1.00 | 0.00 | 1.22 | 17.8 | 79.0 | 5.75 | — | — | — |
| Comparative Example 8 | $LiMn_{0.25}Ni_{0.25}Co_{0.50}O_2$ | 0.50 | 0.01 | 0.53 | 1.4 | 93.1 | 5.20 | 1.0% | — | — |
| Comparative Example 9 | $LiMn_{0.25}Ni_{0.25}Co_{0.50}O_2$ | 0.50 | 0.01 | 0.23 | 11.0 | 89.2 | 5.38 | — | 1.0% | — |
| Comparative Example 10 | $LiCoO_2$ | 1.00 | 0.00 | 1.17 | 9.5 | 82.7 | 5.40 | 0.5% | 0.5% | 0.5% |

The prismatic nonaqueous electrolyte secondary batteries of Examples 1 to 5 and Comparative Examples 1 to 9 produced in the above manner were subjected to initial charge-discharge of 4 cycles at 25° C. However, the charging condition of the first cycle was constant current-constant voltage charging at 30 mA of charging current, 4.28 V of charging voltage, and 15 hours of charging time, and the charging condition of the second cycle or later was constant current-constant voltage charging at 60 mA of charging current, 4.28 V of charging voltage, and 6 hours of charging time. The discharging condition of 4 cycles was constant current discharging at 60 mA of discharging current and 2.50 V of final voltage. The discharge capacity at the fourth cycle was defined as "initial discharge capacity $X_a$". After constant current-constant voltage charging at 60 mA of charging current and 4.28 V of charging voltage for 6 hours, that is after constant voltage charging was carried out at 4.28 V in total 6 hours after the voltage reached 4.28 V by charging at 60 mA of current value; the discharge capacity was measured by carrying out constant current discharge in the condition of 60 mA of discharge current and 2.50 V of final voltage.

batteries, based on the initial discharge capacity $X_a$ (mAh), $X_a$ (mA) was defined as 1 ItmA.

The cycle test was carried out by in the following manner. After the initial resistance $R_a$ (initial resistance value) was measured, 300 charge-discharge cycles were carried out at 45° C. in condition of 1 ItmA current value, charging final voltage 4.10 V, final discharge voltage 3.03 V, and SOC 20-80%. After cooling to 25° C., the cell thickness was measured and the discharge capacity $X_a$ was confirmed in the same manners as those for confirming the initial discharge capacity and thereafter, the direct current resistance $R_b$ was measured in the same manner as described above at −20° C. after the charge-discharge cycle test.

The increase ratio of the direct current resistance was calculated from the direct current resistance $R_a$ before the cycle test and the direct current resistance $R_b$ after the cycle test according to the following equation (1).

$$\text{Resistance increase ratio (\%)}=(R_b/R_a-1)\times 100 \qquad (1)$$

The resistance increase ratio is shown in Table 1.
The capacity retention ratio was calculated from the initial discharge capacity $X_a$ confirmed before the cycle test and the direct initial discharge capacity $X_b$ confirmed after the cycle test according to the following equation (2).

$$\text{Capacity retention ratio (\%)} = X_b/X_a \times 100 \quad (2)$$

Effects of Additives

According to Example 4 and Comparative 6, and Comparative Example 1 and Comparative Example 7 with the same compositions of the positive active materials, it was made clear that in a case neither unsaturated sultone nor sulfate ester was added, the resistance increase ratio was high, the capacity retention ratio was low, and the cell thickness was thick. Further, according to Example 6 and Comparative Example 6, and Comparative Example 10 and Comparative Example 1, it was made clear that good addition effect could be caused even in a case of adding additives other than the unsaturated sultone and the sulfate ester. That is, it was made clear that addition of the unsaturated sultone and the sulfate ester could give batteries capable of retaining high input/output performance, hardly being expanded, and excellent in charge-discharge cycle performance.

Effects of Positive Active Material Composition

As compared with Examples with Comparative Examples having positive active materials with c value out of the range of $0.33 \leq c < 1$, it is clear from Table 1 that the resistance increase ratio after repeated charge-discharge cycles was low, the capacity retention ratio was high, and the cell thickness was thin in Examples. That is, the nonaqueous electrolyte secondary batteries of Examples were made clear to have a small resistance increase even if charge-discharge cycles were repeated and thus to be excellent in charge-discharge cycle performance.

It is made apparent from Table 1 that the above effects of the additives and the positive active material were caused in a synergetic manner.

That is, in the present invention, it is made clear that if an unsaturated sultone and a sulfate ester are added to an electrolyte solution of a nonaqueous electrolyte secondary battery containing a positive active material having a composition of $Li_xMn_aNi_bCo_cO_d$ ($0 < x < 1.3$; $a+b+c=1$; $1.7 \leq d \leq 2.3$) and further the composition satisfies $|a-b| < 0.03$ and $0.33 \leq c < 1$, the battery becomes excellent in charge-discharge cycle performance.

Since the unsaturated sultone was consumed partially on the electrodes when the charging-discharging were carried out after battery production, the amount contained in the nonaqueous electrolyte in the battery was generally decreased from the addition amount.

At the time of producing the battery, when the addition amount of 1,3-propene sultone in the nonaqueous electrolyte to be used was variously changed and the experiments were carried out in the same manner as in Examples, if the addition amount of 1,3-propene sultone was 0.01 to 5.0% by mass, it was confirmed that the same effect was caused. In addition, when cells of Example 1 were separately produced and the nonaqueous electrolyte was sampled and analyzed after the above initial charging-discharging were carried out, 10 ppm of 1,3-propene sultone was detected.

While the present invention has been described in detail with reference to specific aspects, it is apparent for those skilled in the art that various modifications and alterations can be carried out without departing from the true spirit and scope of the present invention.

The present application is made in accordance with Japanese Patent Application (Japanese Patent Application Laid-Open No. 2006-247072) submitted on Sep. 12, 2006, which is incorporated herein by reference in its entirety.

Further, the references cited herein are entirely incorporated in this specification.

Industrial Applicability

According to the present invention, a nonaqueous electrolyte secondary battery excellent in input performance and output performance can be provided since the battery can suppress an increase of inner resistance even in a case of use by repeated charging-discharging, scarcely decrease-capacity retention ratio, and suppress expansion of the battery.

The invention claimed is:

1. A nonaqueous electrolyte secondary battery comprising a positive electrode containing a positive active material having an α-NaFO$_2$-type crystal structure and being expressed by a composition formula $Li_xMn_aNi_bCo_cO_d$ ($0 < x < 1.3$; $a+b+c=1$; $1.7 \leq d \leq 2.3$) while satisfying $|a-b| < 0.03$ and $0.33 \leq c < 1$, a negative electrode, and a nonaqueous electrolyte containing an unsaturated sultone and a sulfate ester compound.

2. The nonaqueous electrolyte secondary battery according to claim 1, wherein said unsaturated sultone is a 1,3-propene sultone derivative defined by the chemical formula 1:

[Chemical Formula 1]

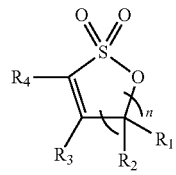

wherein $R_1$ to $R_4$ each denote a hydrogen atom or the same or different alkyl group, an alkoxyl group, halogen, a halogen-containing alkyl group, or an aryl group; and n is 1 or 2.

3. The nonaqueous electrolyte secondary battery according to claim 1 or 2, wherein said sulfate ester compound is a cyclic sulfate ester having 3 or more carbon atoms and defined by the chemical formula 2:

[Chemical Formula 2]

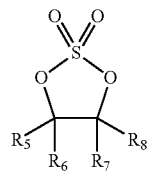

wherein, $R_5$ to $R_8$ each denote a hydrogen atom or the same or different alkyl group, an alkoxyl group, halogen, a halogen-containing alkyl group, or an aryl group.

4. A method for producing a nonaqueous electrolyte secondary battery comprising a step of forming a positive electrode containing a positive active material having an α-NaFO$_2$-type crystal structure and being expressed by a composition formula $Li_xMn_aNi_bCo_cO_d$ ($0 < x < 1.3$; $a+b+c=1$; $1.7 \leq d \leq 2.3$) while satisfying $|a-b| < 0.03$ and $0.33 \leq c < 1$, a step of forming a negative electrode, and a step of adding a nonaqueous electrolyte containing an unsaturated sultone and a sulfate ester compound.

5. The method for producing a nonaqueous electrolyte secondary battery according to claim 4, wherein said unsaturated sultone is a 1,3-propene sultone derivative defined by the chemical formula 1:

[Chemical Formula 1]

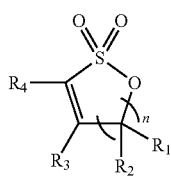

wherein $R_1$ to $R_4$ each denote a hydrogen atom or the same or different alkyl group, an alkoxyl group, halogen, a halogen-containing alkyl group, or an aryl group; and n is 1 or 2.

6. The method for producing a nonaqueous electrolyte secondary battery according to claim 4 or 5, wherein said sulfate ester compound is a cyclic sulfate ester having 3 or more carbon atoms and defined by the chemical formula 2:

[Chemical Formula 2]

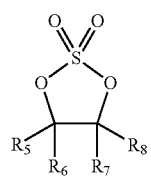

wherein, $R_5$ to $R_8$ each denote a hydrogen atom or the same or different alkyl group, an alkoxyl group, halogen, a halogen-containing alkyl group, or an aryl group.

* * * * *